(12) United States Patent
Ishikura

(10) Patent No.: US 7,475,009 B2
(45) Date of Patent: Jan. 6, 2009

(54) TEXT INPUT SUPPORT SYSTEM AND METHOD

(76) Inventor: Hiroshi Ishikura, 6-10-9 Hashiramoto, Takatsuki, Osaka, 569-0844 (JP)

( * ) Notice: Subject to any disclaimer, the term of this patent is extended or adjusted under 35 U.S.C. 154(b) by 672 days.

(21) Appl. No.: 10/467,212

(22) PCT Filed: Jun. 11, 2001

(86) PCT No.: PCT/JP01/04952

§ 371 (c)(1),
(2), (4) Date: Jan. 15, 2004

(87) PCT Pub. No.: WO02/101578

PCT Pub. Date: Dec. 19, 2002

(65) Prior Publication Data

US 2004/0123248 A1    Jun. 24, 2004

(51) Int. Cl.
G06F 17/21 (2006.01)
G06F 17/28 (2006.01)
G06F 17/30 (2006.01)
G10L 11/00 (2006.01)
G10L 21/00 (2006.01)

(52) U.S. Cl. .................. 704/10; 704/7; 704/9; 704/277; 715/259

(58) Field of Classification Search .................. 704/10
See application file for complete search history.

(56) References Cited

U.S. PATENT DOCUMENTS

| 5,262,948 | A | * | 11/1993 | Kato ........................... 715/534 |
| 5,369,577 | A | * | 11/1994 | Kadashevich et al. .......... 704/9 |
| 5,806,021 | A |   | 9/1998  | Chen et al. ..................... 704/9 |
| 6,173,251 | B1 | * | 1/2001 | Ito et al. ........................ 704/7 |

FOREIGN PATENT DOCUMENTS

| EP | 643357 A2 * | 3/1995 |
| JP | 05-040750   | 2/1993 |
| JP | 06-168243   | 6/1994 |
| JP | 10-232863   | 9/1998 |

OTHER PUBLICATIONS

JPO Machine Translation of Matsutaka (05-040750) reference supplied by applicant.*

* cited by examiner

*Primary Examiner*—David R Hudspeth
*Assistant Examiner*—Justin W Rider
(74) *Attorney, Agent, or Firm*—Fish & Richardson P.C.

(57) ABSTRACT

Methods and apparatus, including computer program products, featuring techniques for text input support that, among other capabilities, can automatically convert a string of characters lacking spaces into a sentence that includes spaces. The apparatus and methods may find applicability, for example, when an operator inputs characters sequentially for generating text composed of plural words separated from each other with spaces, like English or French text.

24 Claims, 6 Drawing Sheets

FIG. 2

| REGISTERED WORD | INCLUDED WORD | PLURAL EXPRESSION | CONVERTED WORD |
|---|---|---|---|
| a | NOT EXIST | NOT EXIST | FIXED "a" |
| (OMISSION) | | | |
| advise | NOT EXIST | NOT EXIST | FIXED "advise" |
| advised | EXIST | NOT EXIST | FIRST OPTION "advised" SECOND OPTION "advise" |
| advisedly | EXIST | NOT EXIST | FIRST OPTION "advisedly" SECOND OPTION "advised" |
| advisee | EXIST | NOT EXIST | FIRST OPTION "advisee" SECOND OPTION "advise" |
| advisement | EXIST | NOT EXIST | FIRST OPTION "advisement" SECOND OPTION "advise" |
| adviser | EXIST | NOT EXIST | FIRST OPTION "adviser" SECOND OPTION "advise" |
| (OMISSION) | | | |
| afield | EXIST | NOT EXIST | FIRST OPTION "afield" SECOND OPTION "a" |
| (OMISSION) | | | |
| am | EXIST | NOT EXIST | FIRST OPTION "am" SECOND OPTION "a" |
| chicago | NOT EXIST | NOT EXIST | FIXED "Chicago" |
| (OMISSION) | | | |
| christ | NOT EXIST | NOT EXIST | FIXED "Christ" |
| (OMISSION) | | | |
| may | NOT EXIST | EXIST | FIRST OPTION "may" SECOND OPTION "May" |

TEXT INPUT SUPPORT SYSTEM AND METHOD

CROSS-REFERENCE TO RELATED APPLICATIONS

This application is a national phase application of International Application Number PCT/JP01/04952, having an International filing date of Jun. 11, 2001.

TECHNICAL FIELD

The following description relates to a system and techniques for text input support, for example, for use in inputting text containing multiple words separated from each other with spaces, as is common in languages such as English, French and the like.

BACKGROUND

Recently, along with the progression of computer technology, opportunities to input text by using a computer (including a word processor) have increased. Such input of text is usually performed by using a keyboard that has a plurality of key switches arranged by a predetermined rule. The arrangement of the keyboard is based on that of a typewriter, and the method of inputting text, such as English or French text, by using a computer also follows the method for the typewriter.

An operator presses corresponding keys of a keyboard sequentially in accordance with the spelling of a word and presses a space key between words. In addition, the operator presses a shift key together with a character key corresponding to a leading character of a sentence or a proper noun (every noun in German) to capitalize the character. Furthermore, the operator presses a key of a mark such as a comma, a period (a full stop mark) or a quotation mark.

In the case of a Japanese word processor, in order to input text containing kana and Chinese characters by using the above-mentioned keyboard, input methods including Roman letters to kana conversion and kana to Chinese characters conversion are developed and used widely. A program that is specialized in supporting input of Japanese text is called a Japanese front end processor (FEP).

In contrast, input of European and American text, especially English text, usually does not need such a conversion. The text can be entered by pressing keys of a keyboard corresponding to alphabets and numerals without a conversion. Special letters used in German or French are usually entered by combining plural keys or by selecting from a character table. Therefore, there is little necessity of the above-mentioned text input support program such as the Japanese front end processor including the conversion of character strings.

However, some people who are learning input of text, such as English or French text, using a keyboard may feel that the above-mentioned capitalizing and spacing operation are additional labor. That is, it would be convenient if there was a support system to convert a string of characters into a correct sentence, when an operator inputs characters sequentially like a verbal message without being aware of capitalizing and spacing. Such a text input support system may be also a convenient function for the above-mentioned Japanese front end processor when inputting text, such as English text, under the condition where the Japanese front end processor is active.

Furthermore, recent widespread use of cell phones and portable terminals has increased opportunities of using a keyboard that is different from the conventional keyboard in a key arrangement and has less keys or using a newly developed input gears such as a dial. If the text input support system does not require an operator to be aware of capitalizing and spacing, it will be useful when the operator who is not used to a keyboard inputs text such as English or French text by using the above-mentioned input means.

SUMMARY

The following describes a text input support system, and corresponding techniques for using the system that, among other capabilities, can automatically convert a string of characters lacking spaces into a sentence that includes spaces. The system and methods may find applicability, for example, when an operator inputs characters sequentially for generating text composed of plural words separated from each other with spaces, like English or French text.

In general, in one aspect, a text input support system for supporting input of text including a plurality of words separated from each other with spaces, includes the following: a keyboard for inputting a character string; a display device for displaying the input character string; a storage device for storing a program and data; a processor for processing the character string input by the keyboard in accordance with the stored program; and a dictionary registering words that can be used for text input, the dictionary being stored in the storage device as data. The processor compares the input character string with words registered in the dictionary one-by-one character starting from a leading character, memorizes a word that is identical to the input character string, makes the word that was identical to the input character string in a previous iteration a fixed character string upon determining that no possibility exists that the input character string will be identical to a word registered in the dictionary, and adds a space after the fixed character string so as to separate the character string from a subsequent input character string.

Implementations of the system can include one or more of the following. When a mark is entered, the processor can generate a fixed character string that is equal to the input character string without the entered mark, and display the mark after the fixed character string. The dictionary can have a registered word field and a converted word field, and the processor can replace the fixed character string with a converted word corresponding to a registered word. If a plurality of converted words having different expressions for the registered word exist, the processor can make one of the plurality of converted words the fixed character string, display the other of the plurality of converted words as other choices on the display device so that an operator can select, and replace the fixed character string with an other choice if the operator selects another choice.

If the fixed character string includes another word that is registered in the dictionary, the processor can display the included word as another choice on the display device so that an operator can select said choice. If the operator selects said choice, the processor can cancel the fixed character string followed by a space, make said choice a new fixed character string, and add a space after the new fixed character string so as to separate the character string from a subsequent input character string.

In general, in another aspect, a text input support program for supporting input of text including a plurality of words separated from each other with spaces, can include the following steps, the program being executed by a computer including a keyboard for inputting a character string, a display device for displaying the input character string, a storage device for storing a program and data and a dictionary registering words that can be used for text input, the dictionary being stored in the storage device. The input character string is compared with words registered in the dictionary one-by-one character starting from a leading character. A word that is identical to the input character string is memorized. The word that was identical to the input character string in a previous iteration is made a fixed character string, upon determining that no possibility exists that the input character string will be identical to any word registered in the dictionary. A space is added after the fixed character string so as to separate the current character string from a subsequent input character string.

In general, in another aspect, methods and apparatus, including computer program products, include the following. An input character string including a plurality of characters is received, the input character string including a leading character. The leading character is compared to words in a dictionary. Iteratively, the leading character plus adjacent characters in the input character string are compared to words in the dictionary at least n times, wherein n is a positive integer, until the following conditions are satisfied: the leading character plus (n−1) adjacent characters matches a word in the dictionary; the leading character plus n adjacent characters does not match a word in the dictionary; and the leading character plus n+1 or more adjacent characters cannot match a word in the dictionary.

Implementations can include one or more of the following. The leading character plus (n−1) adjacent characters can be made a fixed character string, and a space can be added after the fixed character string to separate the fixed character string from an adjacent character string. The fixed character string can include an included string matching a different word in the dictionary. User input can be received selecting the different word matching the included string instead of the word matching the fixed character string, the space after the fixed character string can be deleted, the included string can be made the new fixed character string, and a space can be added after the new fixed character string to separate the new fixed character string from an adjacent character string.

The dictionary can further include a converted word corresponding to the word matching the leading character plus (n−1) adjacent characters. The fixed character string can be replaced with a fixed character string corresponding to the converted word. The converted word can be the same as the corresponding word having an uppercase first letter. The dictionary can further include two or more converted words corresponding to the word matching the leading character plus (n−1) adjacent characters. User input can be received selecting one of the converted words, and the fixed character string can be replaced with a fixed character string corresponding to the selected converted word.

The $n^{th}$ character adjacent to the leading character can be a mark. The leading character plus (n−1) adjacent characters can be made a fixed character string, and the mark can be displayed after the fixed character string. If the mark is a sentence stop, two spaces can be added following the mark. If the mark is a comma, a space can be added following the mark.

The details of one or more embodiments are set forth in the accompanying drawings and the description below. Other features and advantages will be apparent from the description and drawings, and from the claims.

DRAWING DESCRIPTIONS

FIG. 2 is a table showing an example of a part of a dictionary that is used for the text input support system.

DETAILED DESCRIPTION

Figure 1:
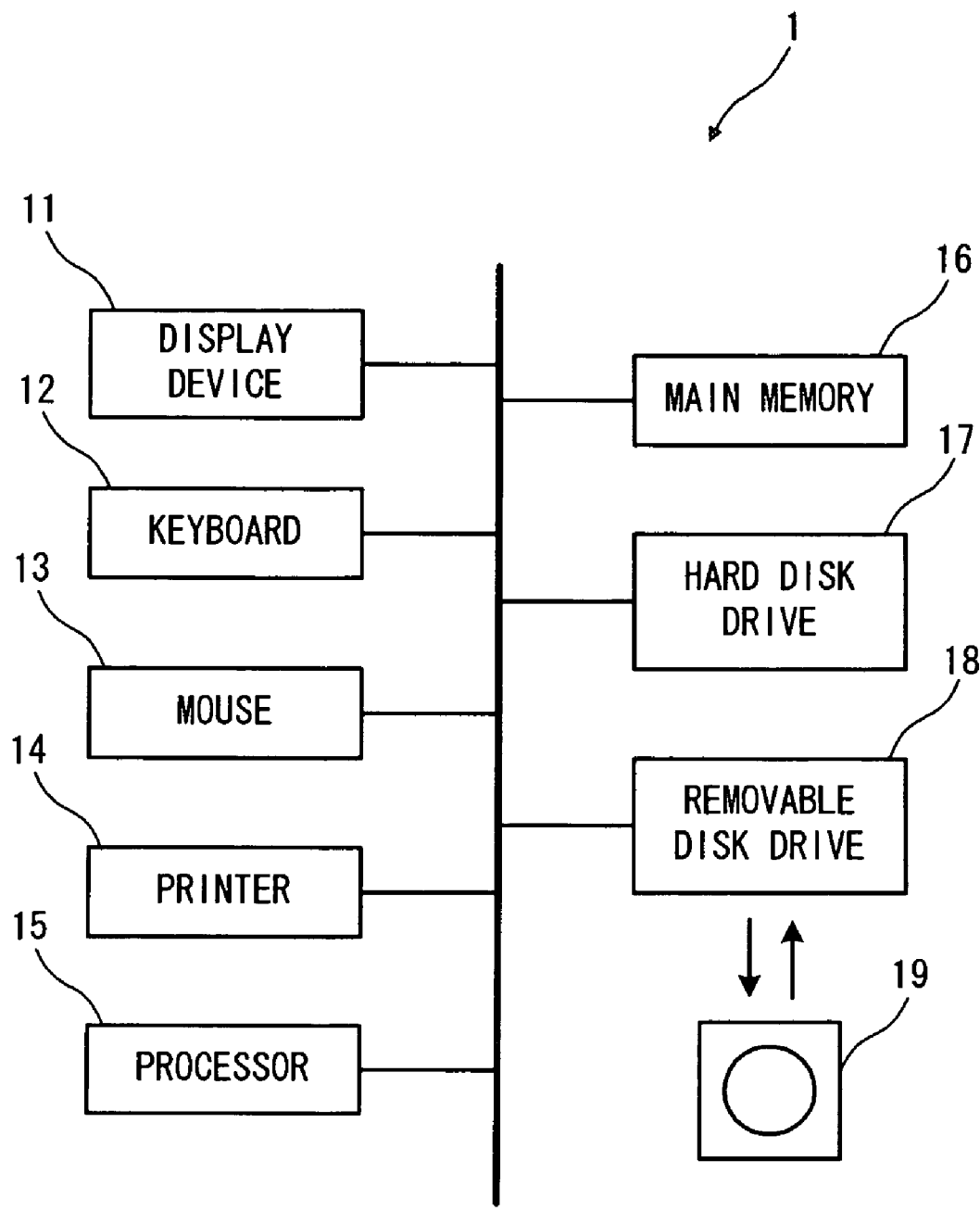
FIG. 1 is a block diagram showing a general configuration of a text input support system.

A text input support system can be implemented using the following elements: a keyboard for entering a character string; a display device for displaying the entered character string and text; a storage device for storing a program and data; a processor for processing the character string entered by the keyboard in accordance with the program; and a dictionary registering all words that can be used for the text input and being stored in the storage device as the data. The processor can compare the entered character string with words registered in the dictionary one by one character from a leading character, memorize a word that is identical to the entered character string, make the word that was identical to the entered character string last time a fixed character string when it is decided there is no possibility that the entered character string will be identical to any word registered in the dictionary, and add a space after the fixed character string so as to separate the character string from a subsequent input character string.

By using this text input support system, the operator only types lower-case characters continuously, and the system decides separation between words and generates a space automatically. Furthermore, the process of this system can be combined with a process for capitalizing a leading character of a sentence, so that the operator can input text, such as English or French text, without being aware of capitalizing or spaces.

Preferably, when a mark such as a comma, a period or a quotation mark is entered, the processor makes the input character string except the mark the fixed character string and displays the mark after the fixed character string. By performing this process, the fixed character string can be determined without referring to the dictionary when a mark is entered. In addition, it is not necessary to register words with marks in the dictionary, so that storage capacity necessary for storing the dictionary can be reduced.

In addition, the dictionary can have a registered word field and a converted word field, and the processor can replace the fixed character string with the converted word corresponding to the registered word. For example, a converted word "Christ" corresponding to a registered word "christ" is registered. According to this process, a word including an upper-case character such as a proper noun can also be generated by automatic conversion from a lower-case character string (a registered word) into an appropriate character string (a converted word) including an upper-case character.

Furthermore, if there are plural converted words having different expressions for the registered word, the processor preferably can make one of the plural converted words the fixed character string, display the other converted word as another choice on the display device so that an operator can select, and replace the fixed character string with the other choice if the operator selects the other choice. For example, this process can be applied to the case where two converted word "may" and "May" exist corresponding to the registered word "may". Utilizing the operator's selection together with the automatic process, it can be expected that the generated sentence will become more appropriate.

Furthermore, if the fixed character string includes another word that is registered in the dictionary, the processor displays the included word as another choice on the display device so that an operator can make a selection. If the operator selects the other choice, the processor cancels the fixed character string followed by a space, makes the other choice a new fixed character string, and adds a space after the new fixed character string, so as to separate the character string from a subsequent input character string. For example, this process can be applied to the case where the fixed character string "advisedly" includes another registered word "advised". In this case too, it can be expected that the generated sentence becomes more appropriate.

The above-mentioned text input support system can be implemented by installing a software program (a text input support program) into a computer system (such a personal computer or a workstation), for example. Such a program can be stored in a storage medium such as a CD-ROM, a FD or a memory card for supply and install into a computer system.

Hereinafter, the text input support system and method will be explained in more detail with reference to attached drawings.

First, a general structure of a text input support system will be explained with reference to the block diagram shown in FIG. 1. The text input support system 1 can include a display device 11, a keyboard 12, a mouse 13, a printer 14, a processor 15, a main memory 16, a hard disk drive 17 and a removal disk drive 18.

The display device 11, which can be a cathode ray tube (CRT), a liquid crystal display (LCD) or others, is used for displaying input character strings or text. The keyboard 12 is used for input of text (character string). The mouse 13 is used as an auxiliary device for inputting text or for selecting a choice among plural conversion alternatives, but is not necessarily required for the text input support system 1. The keyboard 12 is sufficient. The printer 14 is used for printing generated text and others. The processor 15, concerning the text input support system, processes input character strings in accordance with a text input support program that will be explained later for generating text. The processor 15 also performs a general control of the text input support system 1.

The main memory 16 is a semiconductor memory that is used for loading the program executed by the processor 15 and for storing data temporarily. The hard disk drive 17 and the removal disk drive 18 are auxiliary storage devices. The hard disk drive 17 is used for storing programs and data. The removal disk drive 18 is mainly used for installing programs or for data backup and is an optical disk drive or a magneto-optical disk drive.

The above-mentioned text input support system 1 can be constituted by a computer system (especially a personal computer system) and a special text input support program (software). The text input support program is stored in a storage medium 19 such as a CD-ROM for supply and is installed in the hard disk drive 17 via the removal disk drive 18. However, other installing method can be adopted. For example, the text input support program can be downloaded from another computer that is connected to the computer system via a communication interface thereof or from a server connected to a network so that the program is installed in the hard disk drive 17.

Next, the dictionary that is stored in the hard disk drive 17 and is used in this text input support system 1 will be explained. The following explanation takes input of English text as an example. In this dictionary, all words that can be used for input of text are registered. Forms of verbs and plural forms of nouns are also registered in the dictionary. For example, if "book" is registered, the plural form "books" is also registered. An example of a part of the dictionary is shown in FIG. 2.

The table of the dictionary has a field of registered words and a field of converted words. The registered word is a character string that contains only lowercase letters, while the converted word can contain uppercase (capitalized) letters. For example, as for a proper noun such as a person's name or a place name, a converted word whose leading character is capitalized is registered. As a concrete example, a converted word "Chicago" is registered for a registered word "chicago". For most words, including common noun and other word classes, the registered word is the same as the converted word.

In this dictionary, all registered words are arranged in alphabetical order. When performing a process (a matching process) of searching a registered word that is identical to an input character string in accordance with an algorithm that will be explained later, the longest character string is selected with the highest priority to be a fixed character string. When the fixed character string is determined, it is replaced with the converted word corresponding to the registered word. If a mark such as a comma or a period is entered, the current input character string before the mark is fixed without referring the dictionary, and the fixed character string is followed by the mark on the display.

Furthermore, e.g., a registered word "may" has two different converted words "may" and "May". In this case, the former is registered as a first choice and the latter is registered as a second choice in the field of the converted word. If there are three or more converted words, a third choice and other choices are also registered. The dictionary has a plural expression field for indicating whether a registered word has plural converted words in different expressions or not, as shown in FIG. 2. For example, as for the record of the converted word "may", the plural expression field is filled with "EXIST". Concerning the record of the converted word "chicago", the plural expression field is filled with "NOT EXIST".

If plural choices are registered as the converted word, one of the choices is adopted as a default fixed character string. In addition, other choices are displayed on the display device 11 so that the operator can select one of them. When the operator selects one of the other choices, the fixed character string is replaced with the other choice. In the above example, the lower case character string "may" is the default fixed character string, and "May" is displayed as the other choice.

Furthermore, the registered word "advised", for example, includes other registered word "advise". In other words, "advised" can be separated into "advise" and "d". In this case, "advised" is registered as a first choice of the converted word corresponding to the registered word "advised", and "advise" is registered as a second choice. Similarly, as for the registered word "advisedly", a first choice "advisedly" and a second choice "advised" are registered as the converted word.

In this way, if the registered word includes another word (i.e., an included word) too, the other choice except the default choice is displayed on the display device 11 so that the operator can select it. When the operator selects the other choice, the fixed character string is replaced with the other choice. In the above example, the first choice "advisedly" that is the longest becomes the default fixed character string.

In addition, the registered word "afield", for example, includes other registered words "a" and "field". In this case too, the first choice "afield" and the second choice "a" are registered as the converted word, so that fixing process can be performed one by one word from the leading word. The remained character string "field" after the second choice "a" is fixed can be processed as a new input character string. As shown in FIG. 2, the dictionary has an included word field for indicating whether a registered word has an included word or not. For example, "NOT EXIST" is filled in the included word field of the record corresponding to the converted word "advise", and "EXIST" is filled in the included word field of the record corresponding to the converted word "advised".

The above-mentioned way of deciding the default fixed character string is merely an example. It is also possible to constitute the algorithm so as to adopt the character string that is used at the highest frequency as the default fixed character string.

Figure 3:
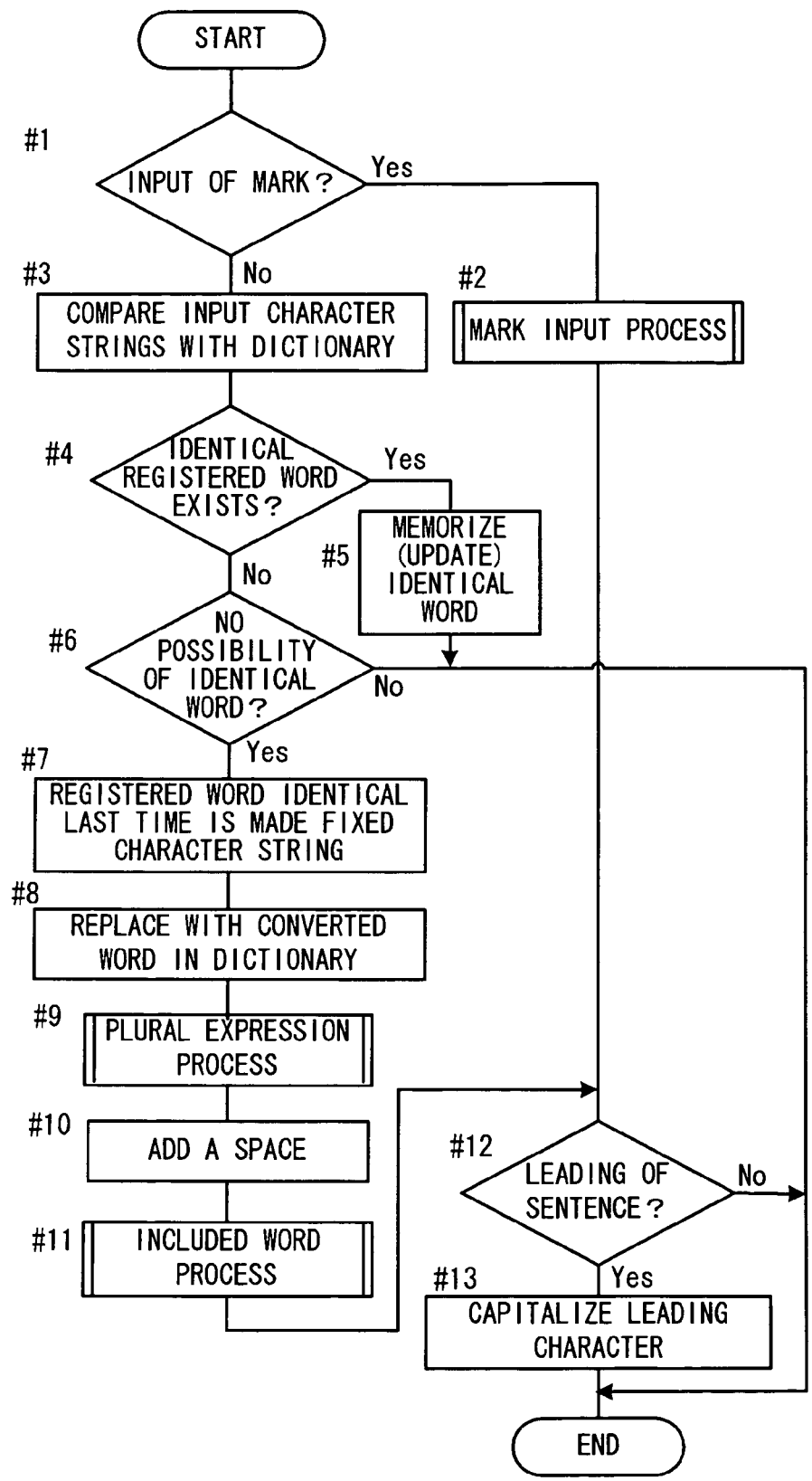
FIG. 3 is a flowchart showing an example of a main routine of a text input support program that is executed when a character or a mark is entered from a keyboard.

Hereinafter, an algorithm of the text input support program according to one embodiment will be explained with reference to flowcharts shown in FIGS. 3-5. First, FIG. 3 is a flowchart showing an example of a main routine of a text input support program that is executed every time when a character or a mark is entered from a keyboard. In Step #1 of the flowchart shown in FIG. 3, it is decided whether the input is a mark or not (a character). If the input is a mark (Yes in Step #1), a subroutine of a mark input process in Step #2 (that will be explained in detail with reference to FIG. 4) is executed and the process jumps to Step #12.

If the input is not a mark, i.e., if the input is a character (No in Step #1), the current input character string is compared with registered words in the dictionary (Step #3). If there is a registered word that is identical to the input character string (hereinafter, referred to as an identical word) (Yes in Step #4), the identical word is memorized (the memory is updated) (Step #5) and the process is finished. For example, if the current input character string is "advise", the identical word "advise" is memorized. However, the character string is not fixed. If the character "d" is entered next time, the memory of the identical word is updated to "advised". In other words, the registered word that is identical to the input character string last time (the last identical word) is memorized finally.

When the character "l" is entered next time, there is no registered word that is identical to the current input character string "advisedl". However, if the character "y" is further entered next time, the current input character string is identical to the registered word "advisedly". That is, though there is no identical registered word at the time point when the character "l" is entered, there is still possibility that the input character string will be identical to the registered word by further input of characters. In this case, the process is finished via "No" in Step #4 and "No" in Step #6.

If a character except "y" is entered after the character "l", there is no possibility that the input character string will be identical to a registered word even after the next character input. In this case, the process goes to Step #7 via "No" in Step #4 and "Yes" in Step #6. In Step #7, the registered word that is identical to the input character string last time (the last identical word) is read out of the memory to be the fixed character string. In the above example, "advised" becomes the fixed character string.

In the next Step #8, the fixed character string is replaced with the converted word "advised" corresponding to the registered word "advised" in accordance with the dictionary. There is no change in the case of the fixed character string "advised", but in the case of the fixed character string "chicago", for example, it is replaced with the converted word "Chicago".

In the next Step #9, the subroutine of the plural expression process is executed. This subroutine will be explained later with reference to FIG. 5. Then in Step #10, a space is added after the fixed character string, so as to separate the subsequent input character string. In Step #11, the subroutine of the included word process is executed, and the process goes to Step #12. This subroutine will be explained later with reference to FIG. 6.

In Step #12, it is decided whether or not the fixed character string is a leading character string of a sentence. This decision can be performed by setting a flag when a mark that is entered at the end of a sentence like a period or a question mark (hereinafter, referred to as a sentence stop mark) is entered, for example. This flag may be set when starting input of text, too. The process is finished if the fixed character string is not the leading character string of a sentence, while the leading character is capitalized in Step #13 if it is the leading character string of a sentence. On this occasion, the above-mentioned flag is reset. Then, the process is finished.

Figure 4:
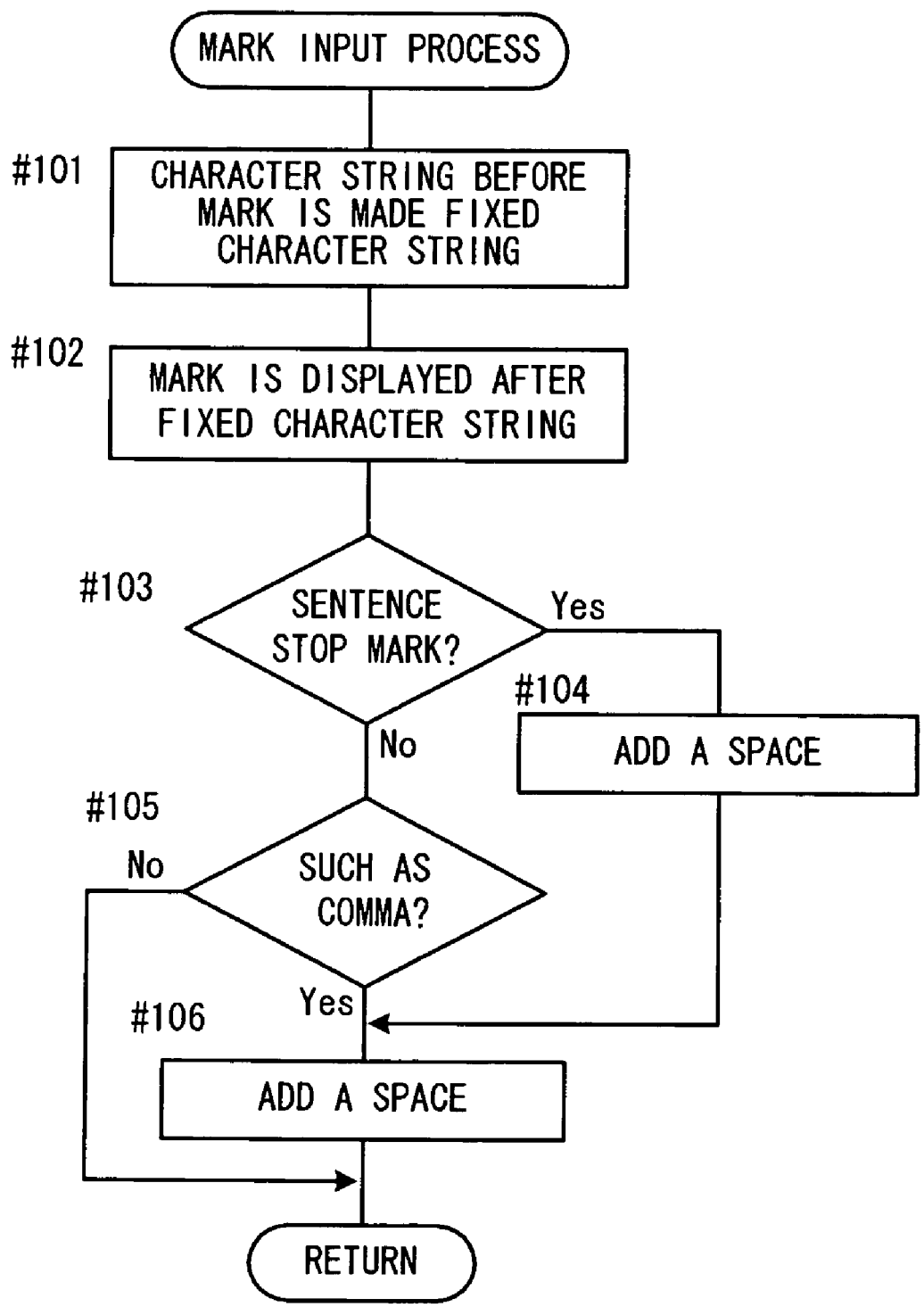
FIG. 4 is a flowchart showing a subroutine of a mark input process in the main routine shown in FIG. 3.

FIG. 4 is a flowchart showing a subroutine of a mark input process in Step #2 of the main routine shown in FIG. 3. First in Step #101, the input character string except the entered mark (before the entered mark) is made the fixed character string. In the next Step #102, the mark is displayed after the fixed character string.

The next process from Step #103 through Step #106 is for adding a space if necessary in accordance with the entered mark. In this example, a double space is added between sentences, i.e., after a sentence stop mark, and a single space is added after a punctuation mark such as a comma within a sentence.

That is, if the entered mark is a sentence stop mark such as a period or a quotation mark (Yes in Step #103), a space is added in Step #104 and another space is added in Step #106. If the entered mark is a punctuation mark within a sentence such as a comma or a semicolon (No in Step #103 and Yes in Step #105), a space is added in Step #106. If the entered mark is neither a sentence stop mark nor a punctuation mark within a sentence but is a mark such as an apostrophe, the process returns to the main routine without adding a space.

Furthermore, if the operator presses a return key for changing a paragraph, the double space that was added after the sentence stop mark is removed. Similarly, the double space that was added after the last sentence stop mark is removed when the input of text is finished.

In addition, a tab or a plurality of spaces may be added at the front of a paragraph if necessary. Word wrap and line boundary character check may also be performed if necessary or in accordance with a set condition. The word wrap is a process of transferring a word to the next line if it exceeds a line margin. The line boundary character check is a process of transferring a mark such as a period or a comma to the end of the previous line exceeding a predetermined line margin if it leads the new line. These processes are well known and not directly relevant to the system described here, so detailed explanations of them are omitted.

Figure 5:
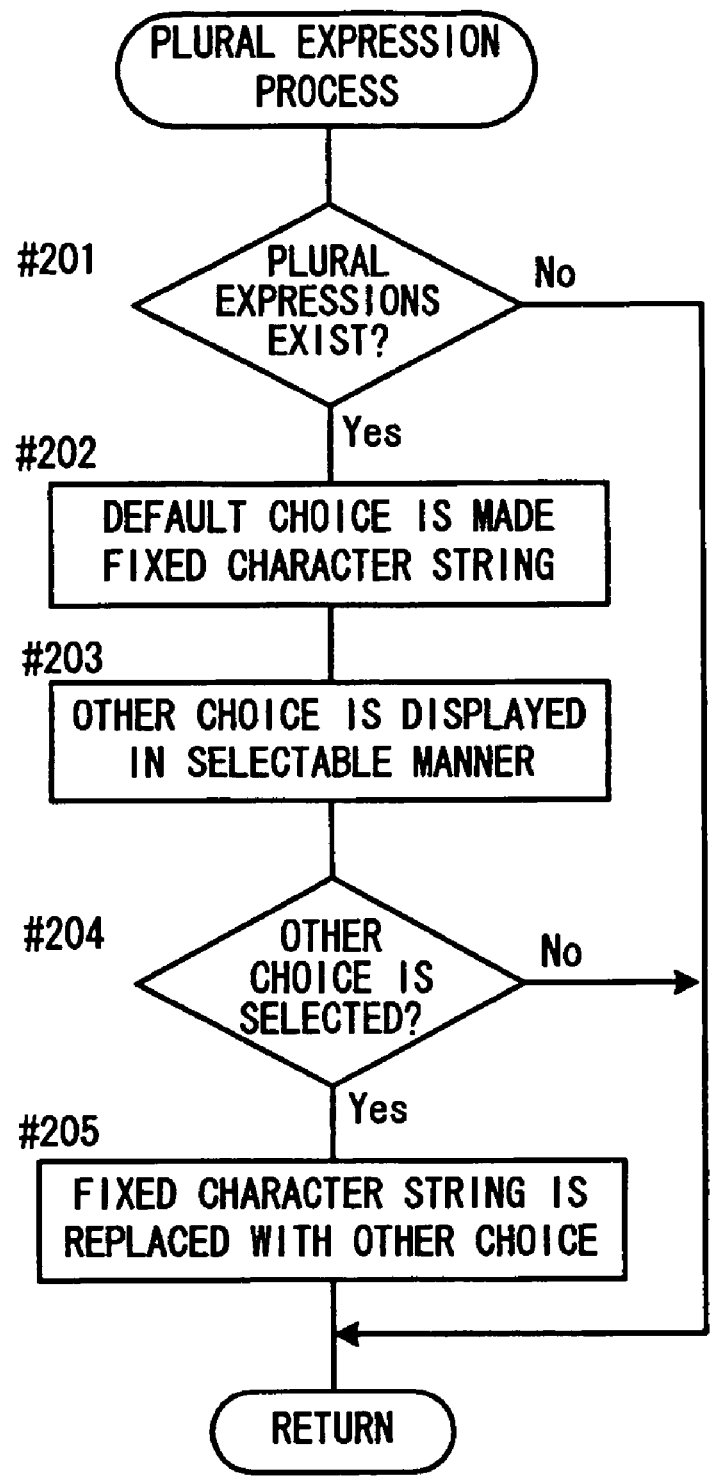
FIG. 5 is a flowchart showing a subroutine of a plural expression process in the main routine shown in FIG. 3.

FIG. 5 is a flowchart showing a subroutine of a plural expression process in Step #9 of the main routine shown in FIG. 3. First in Step #201, the plural expression field of the dictionary is referred to for checking whether there are plural expressions or not. If there are plural expressions, the default choice is made the fixed character string in Step #202. Then in Step #203, the other choice is displayed in a selectable manner. For example, the first choice "may" of the converted word corresponding to the registered word "may" is made the fixed character string, and the second choice "May" is displayed in a selectable manner.

Here, "be displayed in a selectable manner" means to be displayed in such a way that the operator can recognize that there is another choice (another expression) on the screen of the display device 11. For example, the other choice may be displayed adjacently to the default choice that is displayed within the input text or may be displayed away from the default choice. The other choice is selected by pressing a special key such as a space key. If there are two or more other choices, the key may be pressed plural times so that a selected choice is changed in turn.

When another key (a key for entering a character or a mark) is pressed without pressing the key for selecting the other choice (e.g., the space key), it is regarded that the other choice is not selected. If the other choice is not selected (No in Step #204), the process goes back to the main routine with the default choice being made the fixed character string. If the other choice is selected (Yes in Step #204), the fixed character string ("may") is replaced with the other choice ("May") (Step #205), and the process goes back to the main routine.

Figure 6:
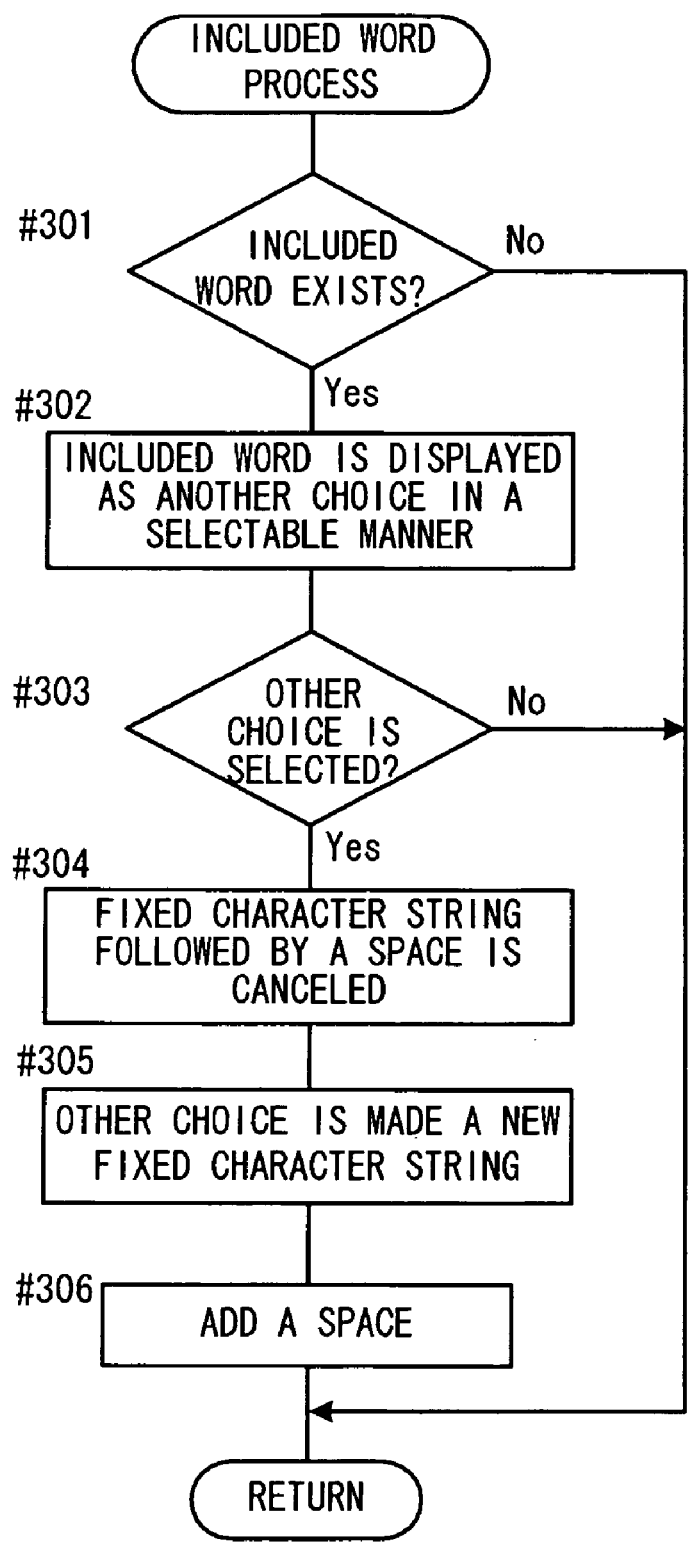
FIG. 6 is a flowchart showing a subroutine of an included word process in the main routine shown in FIG. 3.

FIG. 6 is a flowchart showing a subroutine of an included word process in Step #11 of the main routine shown in FIG. 3. First in Step #301, the included word field of the dictionary is referred to so as to check whether there is an included word or not. If the included word exists, the included word is displayed in a selectable manner as another choice Step #302. For example, when the first choice "advised" of the converted word corresponding to the registered word "advised" is displayed as the fixed character string, the second choice "advise" that is an included word is displayed in a selectable manner.

Here, "be displayed in a selectable manner" means to be displayed in such a way that the operator can recognize that there is another choice (an included word) on the screen of the display device 11. For example, the other choice may be displayed adjacently to the default choice that is displayed within the input text or may be displayed away from the default choice. The other choice is selected by pressing a special key such as a space key. If there are two or more other choices, the key may be pressed plural times so that a selected choice is changed in turn.

When another key (a key for entering a character or a mark) is pressed without pressing the key for selecting the other choice (e.g., the space key), it is regarded that the other choice is not selected. If the other choice is not selected (No in Step #303), the process goes back to the main routine. If the other choice is selected (Yes in Step #303), the fixed character string followed by a space (e.g., "advised") is canceled in Step #304. Then, the other choice (e.g., "advise") is made a new fixed character string (Step #305), and a space is added after that (Step #306). Then, the process goes back to the main routine. In this example, the subsequent input character string that is separated with a space starts from "d" that is already entered.

The following explanation is based on a concrete example of the input text. An example of the English input text is: "This is the first time I have listened to jazz. It is fantastic!". The operator of the text input support system types merely a sequential character string "thisisthefirsttimeihavelistenedtojazz.itisfantastic!" on the keyboard.

For the simple explanation, it is supposed that the following conditions are set, though the conditions can be set freely. The number of characters that can be entered per line corresponds to 30 lower-case letters. A mark (except letters) occupies the width of one lower-case letter, while an upper-case letter occupies the width of two lower-case letters. A proportional font that has different widths for different letters is not taken into consideration, but the above-mentioned condition is applied to every character or mark. Furthermore, the above-mentioned word wrap process is performed, but a tab or a plurality of spaces is not inserted in the front of paragraphs.

The operator starts the input from "t" and goes ahead to the input of "this" when the input character string becomes identical to the registered word "this" of the dictionary. Then, the identical word "this" is memorized (Step #5 in FIG. 3). When "i" is entered after that, there is no registered word whose leading character string is identical to the current input character string "thisi". There is no possibility that the input character string will be identical to a registered word even after the next character input. At this time point, the registered word "this" that is identical to the input character string the last time is read out to be the fixed character string (Step #7 in FIG. 3). Then, since the registered word "this" does not have plural expressions, the fixed character string "this" becomes fixed finally, which is followed by a space (Step #10 in FIG. 3).

In addition, since the registered word "this" does not have an included word, the fixed character string "this" followed by a space is not changed (is fixed finally). Since it is the leading character string of a sentence, which is decided as explained above, the leading character is capitalized (Step #13 in FIG. 3). The current input text is "This i", and the input character string that starts from "i" becomes the target of the process. On this occasion, the memory area of the identical word is cleared.

The registered word "i" is memorized as the identical word. When "s" is further entered, the registered word that is identical to the input character string "is" is found in the dictionary. Therefore, the memory of the identical word is updated to "is". After that, the input character string becomes "isthe", when it is decided there is no possibility that the input character string will be identical to a registered word. Therefore, the identical word "is" becomes the fixed character string and is followed by a space. The input text at this time point is "This is the", but the input character string that is the process target is still "is". Since the registered word "is" has the included word "i", the other choice "i" of the fixed character string "is" is displayed in a selectable manner (Step #302 in FIG. 6).

If the operator inputs the next character "f" without selecting (i.e., with neglecting) "i", the input character string to be processed changes to "the". The identical word "the" is memorized, and the input character string becomes "thef". When "i" is entered so that the input character string becomes "thefi", there is no possibility that the input character string will be identical to a registered word. Therefore, the identical word "the" becomes the fixed character string, which is followed by a space. Since the registered word "the" has no included word, the input character string to be processed becomes "fi", and the memory area of the identical word is cleared. The input text at this time point is "This is the fi".

Similar process is repeated until the text "This is the first time i" is entered and the current target of process is the input character string that starts from "i". After the registered word "i" is memorized as the identical word, the input character string becomes "iha". At this time point, it is decided there is no possibility that the input character string will be identical to a registered word. Therefore, the identical word "i" becomes the fixed character string, which is replaced with the converted word "I" in the dictionary and is followed by a space. The input text at this time point is "This is the first time I ha", and the input character string to be processed is "ha".

When the input character string becomes "have", the identical word "have" is memorized. Later, when the input character string becomes "havelis", it is decided there is no possibility that the input character string will be identical to a registered word. Therefore, the identical word "have" becomes the fixed character string, which is followed by a space. The input text at this time point is "This is the first time I have lis", and the input character string to be processed is "lis". At this time point, the input text exceeds the number "30" of characters per line that was set as the above-mentioned condition. Therefore the display after the input character string "lis" is transferred to the second line.

Similar process is repeated until the input text becomes "This is the first time I have (line feed) listened to jazz" and the current input character string to be processed is "jazz". When the period is entered next, "jazz" becomes the fixed character string (Step #101 in FIG. 4), and the period is displayed (Step #102 in FIG. 4). Furthermore, a double space is added automatically (Steps #104 and #106 in FIG. 4). The input text at this time point is "This is the first time I have (line feed) listened to jazz.". A flag is set for indicating that the next input character string is a leading character string of a sentence, as mentioned above.

Similar input support process is performed also for the next sentence. When the input character string becomes "This is the first time I have (line feed) listened to jazz. It is fanta", the second line exceeds the number "30" of characters per line. Therefore, the current input character string "fanta" to be processed is transferred to the third line. Furthermore, when the input character string becomes "fan", the registered word "fan" is memorized as the identical word. The memory of the identical word is updated to the registered word "fantast" when the current input character string becomes "fantast". The memory of the identical word is further updated to the registered word "fantastic" when the current input character string becomes "fantastic".

In this example, when the exclamation mark (!) is entered next, the input character string "fantastic" except the exclamation mark (!) is fixed, and the exclamation mark (!) is displayed after that (Step #101 and Step #102 in FIG. 4). Differently from this example, if a character input follows the input character string "fantastic", the last identical word "fantastic" is read out to be the fixed character string when it is decided there is no possibility that the input character string will be identical to a registered word, and the included words "fan" and "fantast" are displayed as other choices in a selectable manner.

After the exclamation mark (!) is displayed following the fixed character string "fantastic", a double space is added automatically (Step #104 and Step #106 in FIG. 4). As explained above, the last double space is removed when the text input is finished. Thus, the character string "thisisthefirsttimeihavelistenedtojazz.itisfantastic!" that the operator entered from the keyboard is converted to the text "This is the first time I have (line feed) listened to jazz. It is (line feed) fantastic!" in a predetermined form, which is displayed on the screen of the display device 11.

As explained above, the text input support system inserts a space automatically by comparing the character string that is entered continuously without a space with registered words of the dictionary so as to decide separation between words. On this occasion, the longest word is adopted as a default fixed character string (word). If the fixed character string includes a shorter registered word (an included word), the included word is displayed as another choice in a selectable manner so that the final decision of the fixed character string is performed after the operator's selection or non-selection.

However, it is possible to select the conversion choice automatically to some extent when the fixed character string has an included word. The following explanation is an example method of selecting automatically an appropriate choice among conversion choices including an included word by using the relationship between the current input character string and a subsequent input character string.

For example, it is supposed to enter a character string "oursection" intending to input "our section". When the input character string becomes "oursec", there is no possibility that the input character string will be identical to a registered word. Therefore the character string "ours" is fixed. This fixed character string "ours" has the included word "our". When processing the subsequent input character string, not only the input character string that starts from "ec" when the character string "ours" was separated but also the input character string that starts from "sec" when the character string "our" was separated is evaluated in parallel. As a result, it is decided that the former character string that starts from "ec" has no possibility to be identical to a registered word when the input character string becomes "ecti". Since no identical word is memorized, an error occurs. In contrast, the latter character string that starts from "sec" becomes "section" that is found as a registered word in the dictionary. Thus, "our section" is fixed finally as an appropriate separation.

If the operator intends to input "our sport" and types the character string "oursport" in the above-mentioned method, "ours port" will be recognized as an appropriate separation. In this case, it is possible to constitute the program to select the separation in which the second character string is longer. Namely, not "ours port" but "our sport" is selected automatically as an appropriate separation. It is found that generally high probability of being an appropriate separation can be obtained by selecting the separation in which the second character string is longer.

In another method, classes of registered words and information about connection with other word are registered in the dictionary, and an appropriate choice is selected automatically among conversion choices including the included word in accordance with the relationship between the current character string and the previous fixed character string.

Furthermore, an error process when the operator makes a typo is not mentioned in the above embodiment. For example, if no identical word is memorized (if the memory remains cleared before the process of the input character string) when it is decided there is no possibility that the input character string will be identical to a registered word, it is possible to decide that a typo occurs and to display an error message. A beep sound or a sound message may be used for informing the operator of a typo. The beep sound information can be also used together with a display requesting the operator to select.

The systems and techniques described here can be implemented in various forms without being limited to the above embodiment. Particularly, the hardware structure of the text input support system is not limited to a computer having a standard keyboard, but can be a word processing machine, a portable terminal having a special keyboard or any other devices that can used for inputting text.

In addition, though an example of inputting English text is explained in the above-mentioned embodiment, the present systems and techniques may be applied to the input of various text such as German text or French text, which contains plural words separated from each other with spaces.

INDUSTRIAL APPLICABILITY

As explained above, the text input support system described here can be used for a text input machine such as a word processor. The operator types lower-case characters continuously for inputting text such as English or French text contains plural words separated from each other with spaces, and the text input support system generates spaces automatically so as to convert the input character string into an appropriate sentence.

The invention claimed is:

1. A text input support system for supporting input of text including a plurality of words separated from each other with spaces, the system comprising:
   a keyboard for inputting a character string in the Roman alphabet;
   a display device for displaying the input character string;
   a storage device for storing a program and data;
   a processor for processing the character string in the Roman alphabet input by the keyboard in accordance with the stored program; and a dictionary including records registering words in the Roman alphabet that can be used for text input, the dictionary being stored in the storage device as data;

wherein:

the processor compares the input character string in the Roman alphabet with words registered in the dictionary one-by-one character starting from a leading character, memorizes a word that is identical to the input character string, makes the word that was identical to the input character string in a previous iteration a fixed character string upon determining that no possibility exists that the input character string will be identical to another word registered in the dictionary, and adds a space after the fixed character string so as to separate the character string from a subsequent input character string;

records included in the dictionary each include a registered word field, a converted word field and a field indicating whether or not the registered word has an included word; and for records where the registered word has an included word, a plurality of choice words including the included word are registered in the converted word field of the record, and if the fixed character string includes the included word, the processor processes the fixed character string as a temporary fixed character string that is subject to final selection by an operator from among the plurality of choice words.

2. The text input support system according to claim 1, wherein when a mark is entered, the processor generates a fixed character string that is equal to the input character string without the entered mark, and displays the mark after the fixed character string.

3. The text input support system according to claim 1, wherein the processor replaces the fixed character string with a converted word corresponding to a registered word, where both the fixed character string and the converted word are words formed from the Roman alphabet.

4. The text input support system according to claim 3, wherein if a plurality of converted words having different expressions for the registered word exist, the processor makes one of the plurality of converted words the fixed character string, displays the other of the plurality of converted words as other choices on the display device so that an operator can select, and replace the fixed character string with another choice if the operator selects another choice.

5. The text input support system according to claim 1, wherein:

if the fixed character string includes an included word and if the operator selects said included word from the plurality of choice words, the processor cancels the fixed character string followed by a space, makes said choice a new fixed character string, and adds a space after the new fixed character string so as to separate the character string from a subsequent input character string.

6. A computer-readable storage medium storing a program that is executed by a computer including a keyboard for inputting a character string in the Roman alphabet, a display device for displaying the entered character string, and a storage device for storing a program and data, for supporting input of text containing plural words separated from each other with spaces, the program comprising the steps of:

comparing the input character string in the Roman alphabet with words registered in a dictionary in the Roman alphabet one-by-one character starting from a leading character;

memorizing a word that is identical to the input character string;

making the word that was identical to the input character string in a previous iteration a fixed character string upon determining that no possibility exists that the input character string will be identical to any word registered in the dictionary; and adding a space after the fixed character string so as to separate the character string from a subsequent input character string:

wherein the dictionary includes records registering the words each record including a registered word field, a converted word field and a field indicating whether or not the registered word has an included word, and for records where the registered word has an included word, a plurality of choice words including the included word are registered in the converted word field of the record, and if the fixed character string includes the included word, the processor processes the fixed character string as a temporary fixed character string that is subject to final selection by an operator from among the plurality of choice words.

7. A computer-implemented method comprising:

receiving an input character string comprising a plurality of characters in the Roman alphabet, the input character string including a leading character;

comparing the leading character to words in a dictionary including records registering words formed from the Roman alphabet;

iteratively comparing the leading character plus adjacent characters in the input character string to words in the dictionary at least n times, wherein n is a positive integer, until the following conditions are satisfied:

the leading character plus (n−1) adjacent characters matches a word in the dictionary, the leading character plus n adjacent characters does not match a word in the dictionary, and the leading character plus n+1 or more adjacent characters cannot match a word in the dictionary;

wherein the dictionary includes records registering the words, each record including a registered word field, a converted word field and a field indicating whether or not the registered word has an included word, and for records where the registered word has an included word, a plurality of choice words including the included word are registered in the converted word field of the record, and if the fixed character string includes the included word, the processor processes the fixed character string as a temporary fixed character string that is subject to final selection by an operator from among the plurality of choice words.

8. The method of claim 7, further comprising:

making the leading character plus (n−1) adjacent characters a fixed character string; and adding a space after the fixed character string to separate the fixed character string from an adjacent character string.

9. The method of claim 8, wherein the fixed character string includes an included word, the method further comprising:

receiving user input selecting the included word from the plurality of choice words;

deleting the space after the fixed character string;

making the included word the new fixed character string; and adding a space after the new fixed character string to separate the new fixed character string from an adjacent character string.

10. The method of claim 8, wherein the dictionary further includes a converted word formed from the Roman alphabet corresponding to the word matching the leading character plus (n–1) adjacent characters, the method further comprising:
  replacing the fixed character string with a fixed character string corresponding to the converted word.

11. The method of claim 10, wherein the converted word is the same as the corresponding word having an uppercase first letter.

12. The method of claim 8, wherein the dictionary further includes two or more converted words corresponding to the word matching the leading character plus (n–1) adjacent characters, the method further comprising:
  receiving user input selecting one of the converted words; and
  replacing the fixed character string with a fixed character string corresponding to the selected converted word.

13. The method of claim 7, wherein the $n^{th}$ character adjacent to the leading character is a mark, the method further comprising:
  making the leading character plus (n–1) adjacent characters a fixed character string; and
  displaying the mark after the fixed character string.

14. The method of claim 13, wherein the mark is a sentence stop, the method further comprising:
  adding two spaces following the mark.

15. The method of claim 13, wherein the mark is a comma, the method further comprising:
  adding a space following the mark.

16. A computer program product, tangibly stored on a machine-readable medium, comprising instructions operable to cause a programmable processor to perform operations comprising:
  receiving an input character string comprising a plurality of characters in the Roman alphabet, the input character string including a leading character;
  comparing the leading character to words included in a dictionary including records registering words formed from the Roman alphabet;
  iteratively comparing the leading character plus adjacent characters in the input character string to words included in the dictionary at least n times, wherein n is a positive integer, until the following conditions are satisfied:
    the leading character plus (n–1) adjacent characters matches a word in the dictionary,
    the leading character plus n adjacent characters does not match a word in the dictionary, and
    the leading character plus n+1 or more adjacent characters cannot match a word in the dictionary
  wherein the dictionary includes records registering the words, each record including a registered word field, a converted word field and a field indicating whether or not the registered word has an included word, and for records where the registered word has an included word, a plurality of choice words including the included word are registered in the converted word field of the record, and if the fixed character string includes the included word, the processor processes the fixed character string as a temporary fixed character string that is subject to final selection by an operator from among the plurality of choice words.

17. The computer program product of claim 16, further comprising instructions operable to cause a programmable processor to perform operations comprising:
  making the leading character plus (n–1) adjacent characters a fixed character string; and
  adding a space after the fixed character string to separate the fixed character string from an adjacent character string.

18. The computer program product of claim 17, wherein the fixed character string includes an included word, the computer program product further comprising instructions operable to cause a programmable processor to perform operations comprising:
  receiving user input selecting the included word from the plurality of choice words;
  deleting the space after the fixed character string;
  making the included word the new fixed character string; and
  adding a space after the new fixed character string to separate the new fixed character string from an adjacent character string.

19. The computer program product of claim 17, wherein the dictionary further includes a converted word formed from the Roman alphabet corresponding to the word matching the leading character plus (n–1) adjacent characters, the computer program product further comprising instructions operable to cause a programmable processor to perform operations comprising:
  replacing the fixed character string with a fixed character string corresponding to the converted word.

20. The computer program product of claim 19, wherein the converted word is the same as the corresponding word having an uppercase first letter.

21. The computer program product of claim 17, wherein the dictionary further includes two or more converted words corresponding to the word matching the leading character plus (n–1) adjacent characters, the computer program product further comprising instructions operable to cause a programmable processor to perform operations comprising:
  receiving user input selecting one of the converted words; and
  replacing the fixed character string with a fixed character string corresponding to the selected converted word.

22. The computer program product of claim 16, wherein the $n^{th}$ character adjacent to the leading character is a mark, the computer program product further comprising instructions operable to cause a programmable processor to perform operations comprising:
  making the leading character plus (n–1) adjacent characters a fixed character string; and
  displaying the mark after the fixed character string.

23. The computer program product of claim 22, wherein the mark is a sentence stop, the computer program product further comprising instructions operable to cause a programmable processor to perform operations comprising:
  adding two spaces following the mark.

24. The computer program product of claim 22, wherein the mark is a comma, the computer program product further comprising instructions operable to cause a programmable processor to perform operations comprising:
  adding a space following the mark.

* * * * *